O. P. RICE.
Vehicle Axle-Boxes.
No. 143,300.                    Patented September 30, 1873.
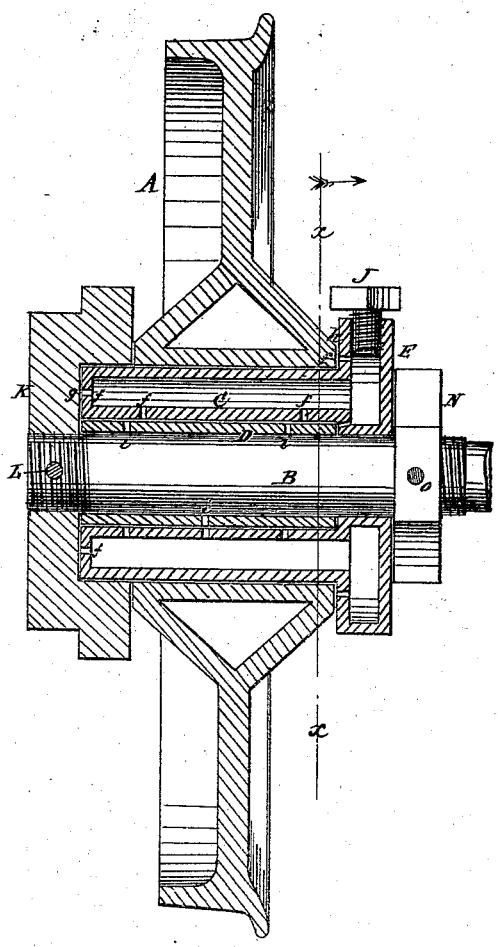
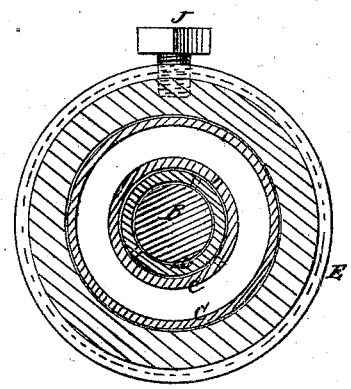
Witnesses:                    Oliver P. Rice   Inventor,
Per                   Attorneys.

UNITED STATES PATENT OFFICE.

OLIVER P. RICE, OF NEW YORK, N. Y.

IMPROVEMENT IN VEHICLE AXLE-BOXES.

Specification forming part of Letters Patent No. 143,300, dated September 30, 1873; application filed August 4, 1873.

*To all whom it may concern:*

Be it it known that I, OLIVER P. RICE, of the city, county, and State of New York, have invented a new and useful Improvement in Axle-Boxes, of which the following is a specification:

My invention has for its object to diminish the wear and friction of axle journals and boxes, particularly those of rail-car trucks; and it consists in a chambered axle-box provided with a flange in which the lubricating material is contained, in combination with a recessed screw-nut and perforated journal-sleeve, as hereinafter described.

In the drawing, Figure 1 represents a longitudinal section of my improved box, showing the wheel also in cross-section. Fig. 2 is a section of Fig. 1 taken on the line $x$ $x$ looking in the direction indicated by the arrow.

Similar letters of reference indicate corresponding parts.

A is the wheel. B is the axle; C, the box; D, the sleeve within the box. The box C is chambered out and has a hollow flange, E. Lubricating material is introduced into the hollow flange, and finds its way into the chambered box, from which, by means of small orifices $f$, it is discharged to the frictional surfaces $g$ and $h$, and on the sleeve D. The sleeve D is also provided with discharge-orifices $i$, by means of which the axle is lubricated. J is a screw-stopper which closes the hollow flange E, and confines the lubricating material. K is a cap-nut on the end of the axle, which incloses the ends of the box and sleeve, and comes in contact with the hub of the wheel, as seen in Fig. 1. This cap is secured to the axle, and is prevented from turning by means of the pin L, or in any equivalent manner. The inner side of the hollow flange E is in contact with the other side of the hub. N is a nut on the axle, which screws up against the flange E and holds the box in position. This nut is prevented from turning on the axle by means of the pin O, or by any equivalent device.

The axle, it will be seen, is stationary, while the box C and sleeve D are free to revolve with the wheel.

The lubricating material will be allowed to escape only sufficiently fast to keep the axle and sleeve well lubricated.

In this arrangement the friction is reduced to a minimum at all points, there being no one important retarding frictional surface.

Having thus described my invention, I claim as new and desire to secure by Letters Patent—

The chambered axle-box C, provided with the hollow flange E, and perforated as described, in combination with the perforated sleeve D, and nut K, recessed to embrace the ends thereof, all as shown and set forth.

OLIVER P. RICE.

Witnesses:
WILLIAM H. HACKETT,
WM. H. SIRE.